(12) United States Patent
Barnett

(10) Patent No.: US 7,346,553 B2
(45) Date of Patent: Mar. 18, 2008

(54) LICENSE PLATE TRADING SYSTEM AND METHOD

(76) Inventor: Richard Barnett, 1 Return Rd., Bronxville, NY (US) 10708

( * ) Notice: Subject to any disclaimer, the term of this patent is extended or adjusted under 35 U.S.C. 154(b) by 700 days.

(21) Appl. No.: 10/391,182

(22) Filed: Mar. 19, 2003

(65) Prior Publication Data

US 2004/0186786 A1    Sep. 23, 2004

(51) Int. Cl.
*G06Q 30/00*    (2006.01)
(52) U.S. Cl. ........................................... 705/26
(58) Field of Classification Search ................... 705/26
See application file for complete search history.

(56) References Cited

U.S. PATENT DOCUMENTS 6,058,417 A * 5/2000 Hess et al. .................. 709/219

FOREIGN PATENT DOCUMENTS

CN    1253837    *    4/2006

OTHER PUBLICATIONS

Bray, Nicholas, Vanity License Tags Gain in Popularity Throughout Europe—If U R LUCK-E Enough 2 Own 1, a FAN-C PL8 Can Even Spell Big BUX Wall Street Journal. (Eastern edition). New York, NY.: Jun. 9, 1995., downloaded from ProQuest on the Internet on Jun. 19, 2006, 3 pages.*
Don Conkey. Family to auction nations's first auto license plate: Mass. (NU)1; [All Edition], The Patriot Ledger. Quincy, Mass.: Jan. 8, 2000, downloaded from the Internet on Jun. 19, 2006, 3 pages.*
Website printout, "Cherished Numbers and Registration Marks from National Numbers" p. 1; Sep. 20, 2004.
Website printout, "National Numbers: Search Results", pp. 1-2; Sep. 20, 2004.
Website printout, "GR8PL8: Australian Number Plates Australia," p. 1.

* cited by examiner

*Primary Examiner*—James Zurita
(74) *Attorney, Agent, or Firm*—Richard E. Kurtz; Greenberg Traurig, LLP

(57) ABSTRACT

A system and methods through which a person to whom a license plate is issued may trade and transfer rights in the license plate with another person, preferably a resident of the same state. The present invention sets up a marketplace through which such trading can be performed, including providing escrow and other such services for buyers and sellers as necessary to effect such a transaction.

20 Claims, 3 Drawing Sheets

LICENSE PLATE TRADING SYSTEM AND METHOD

FIELD OF THE INVENTION

The present invention relates to the field of electronic commerce. More particularly, the present invention provides a system and methods through which valid license plates or other similar identifiers can be traded by private parties.

BACKGROUND OF THE INVENTION

Vehicle owners in the United States are required to register their vehicle with a Motor Vehicles Department or other state or federal agency. In the case of street-based motor vehicles, such as passenger cars, motorcycles, and most commercial vehicles, such registration is evidenced by attaching a state-issued identifier, typically in the form of a license plate, to the vehicle.

As states grapple with ever-increasing pressure to cap tax levels while at the same time providing the same or higher levels of service to residents, many are looking at alternative forms of fundraising. One source of funds which many states have begun to utilize is charging additional fees to provide residents with customized license plates. Customized license plates, also referred to as vanity plates, permit registrants to put their name, a company name, an expression, or other combination of letters, numbers, or other characters on the license plate rather than a state-generated combination of characters.

SUMMARY OF THE INVENTION

The down side to customized license plates is that only one plate will be issued in a given state with a particular name, expression, or character combination, such as, but not limited to, "I SKI". Although variations on the basic character combination may be issued, such as "ISKI", "I SK1", "I-SKI" for the previous example, most residents typically prefer the more recognizable term. In addition, once the variations have been issued, others wanting to purchase customized license plates with the same or similar combination of characters will not be able to obtain such customized license plates.

Accordingly, the present invention is directed to a license plate trading system and method that substantially obviates one or more of the problems due to limitations and disadvantages of the related art. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings. The terms license plate and license plates are used interchangeably herein, and reference to a single license plate or multiple license plates should not be construed as limiting the invention to that number of license plates.

One aspect of the present invention is the creation of a marketplace through which a state resident to whom a license plate has been issued, referred to herein as the "owner" or "seller", can trade a license plate or license plates with a person who is authorized to receive the license plate or license plates, referred to herein as the "prospective buyer" or "buyer". A preferred license plate trading method includes receiving information about a license plate from a seller; storing the license plate information in a database; presenting license plate information to at least one prospective buyer; recording at least one prospective buyer's desire to purchase the license plate; notifying the seller and the buyer when the transaction can be finalized; receiving payment from the buyer; and, receiving confirmation that the license plate has been transferred to the buyer. License plate information received from a seller can include, but is not limited to, the state or federal agency issuing the license plate, the characters appearing on the license plate, one or more renderings or photographs of the license plate, a minimum price at which the seller is willing to transfer his or her rights to the license plate, and comments from the seller.

Prospective buyers can browse a list of available license plates or search the database for license plates of interest. In a preferred embodiment, prospective buyers searching based on the characters appearing on the license plate can request that the search results contain only exact matches, or prospective buyers can indicate that permutations may be acceptable. Where a prospective buyer indicates that permutations are acceptable, the prospective buyer can select from individual permutations as well as groups of permutations. Examples of such permutations may include, but are not limited to, removing spaces or other non-alphanumeric characters from the license plate characters; substituting the number 1 for the letter I; substituting the number 2 for the words "To", "Too", and "Two"; substituting the letter "B" for the word "be"; substituting the letter "C" for the words "Sea" and "See"; removing one or more characters; and substituting "WE" for "I". Thus, a prospective buyer may search for "I SKI", and the present invention may return "1 SK1", "I SK1", "-ISKI-", "I-SKI", "ISKI", "WE SKI", "WESKI" and the like.

In a preferred embodiment, the price at which a license plate will be sold is determined by an auction which runs for a period of time specified by the seller. In an alternative embodiment, the auction may run until a minimum price selected by the seller is met. In both embodiments, the minimum price at which a seller is willing to sell the license plate is preferably not disclosed to the prospective buyer as this typically encourages higher bids. However, a seller may elect to provide prospective buyers with the minimum sale price if the seller so chooses. In still another embodiment, license plates may be sold using traditional, fixed selling price transactions.

In a preferred embodiment, when a prospective buyer places a bid on a license plate, the prospective buyer supplies credit card or other payment information to the present invention. Where the prospective buyer provides credit card or similar information, a hold may be placed on the credit card for an amount proportionate to the prospective buyer's maximum bid. The amount placed on hold may also include transaction fees which will be assessed to the prospective buyer. Where the prospective buyer has provided a checking account number or similar information as a means of payment, the present invention may verify that sufficient funds are available to meet the maximum bid, including any fees. With accounts that do not support placing holds on the funds, such as traditional checking accounts, the present invention may periodically verify fund availability until the auction is complete or until the prospective buyer is no longer the winning bidder. If the prospective buyer's payment means cannot support the amount bid, as may occur where the funds are withdrawn from a checking account, the prospective buyer's bid may be cancelled.

At the end of the auction or when the transaction is otherwise complete, the buyer and seller are preferably notified of the final selling price, including any processing fees assessed as part of the transaction processing service of the present invention. The parties are also preferably provided with any documentation necessary to facilitate the license plate transfer. Such documentation may include, but is not limited to, state or federal agency specific instructions for effecting the transaction.

The buyer's payment is preferably processed and held in escrow until confirmation is received that the license plates have been properly transferred to the buyer. The seller is given a fixed period of time, such as ten business days, within which to surrender the license plates to the issuing state or federal agency or otherwise legally transfer the plates to the buyer.

In a preferred embodiment, confirmation of effective license plate transfer is provided by the state or federal agency issuing the license plates. Where a state or federal agency provides license plate transfer confirmation, the present invention may refund at least a portion of the buyer's payment if confirmation is not received within a given period of time, such as ten business days.

In an alternative embodiment, confirmation may be provided by the buyer. Where buyer confirmation is used, the present invention may provide payment to the seller if the buyer has not confirmed transfer within a given period of time after the license plates were to have been transferred, such as twenty business days after transaction completion. Such time should be long enough to allow the buyer to lodge a complaint in the event the license plates are not transferred in a timely manner so that the buyer can be refunded.

The license plate trading system of the present invention preferably includes a license plate information collection means; a database, used to store the license plate information collected from the license plate information collection means; a license plate information searching means; a license plate information display means; a buyer payment processing means; a license plate transfer confirmation means; and, a seller payment processing means. In a preferred embodiment, the license plate information collection, license plate information searching, and license plate information display means are each implemented through a World Wide Web based interface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to preferred embodiments of the present invention, examples of which are illustrated in the accompanying drawings.

Figure 1:
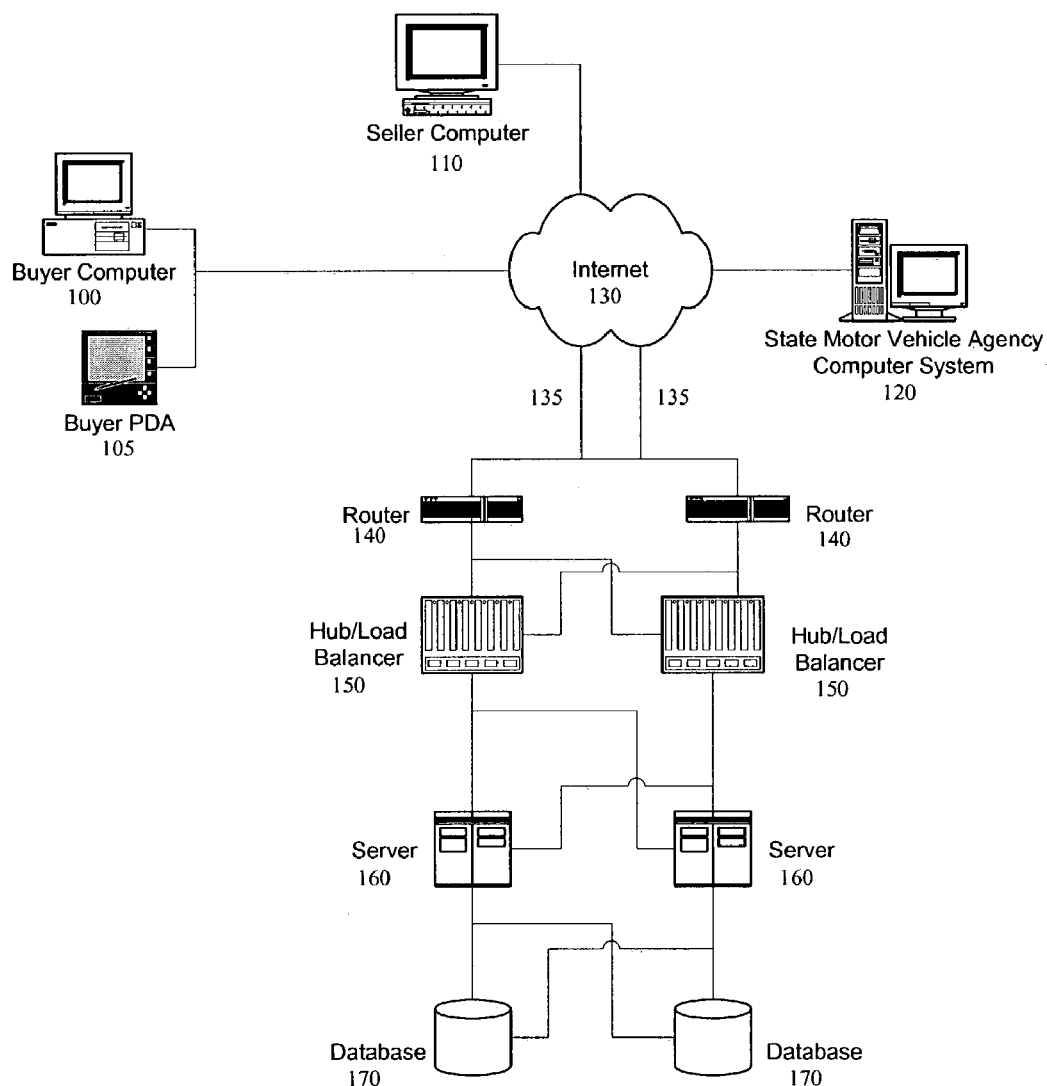
FIG. 1 is a block diagram illustrating a preferred network architecture to support the present invention.
Figure 2:
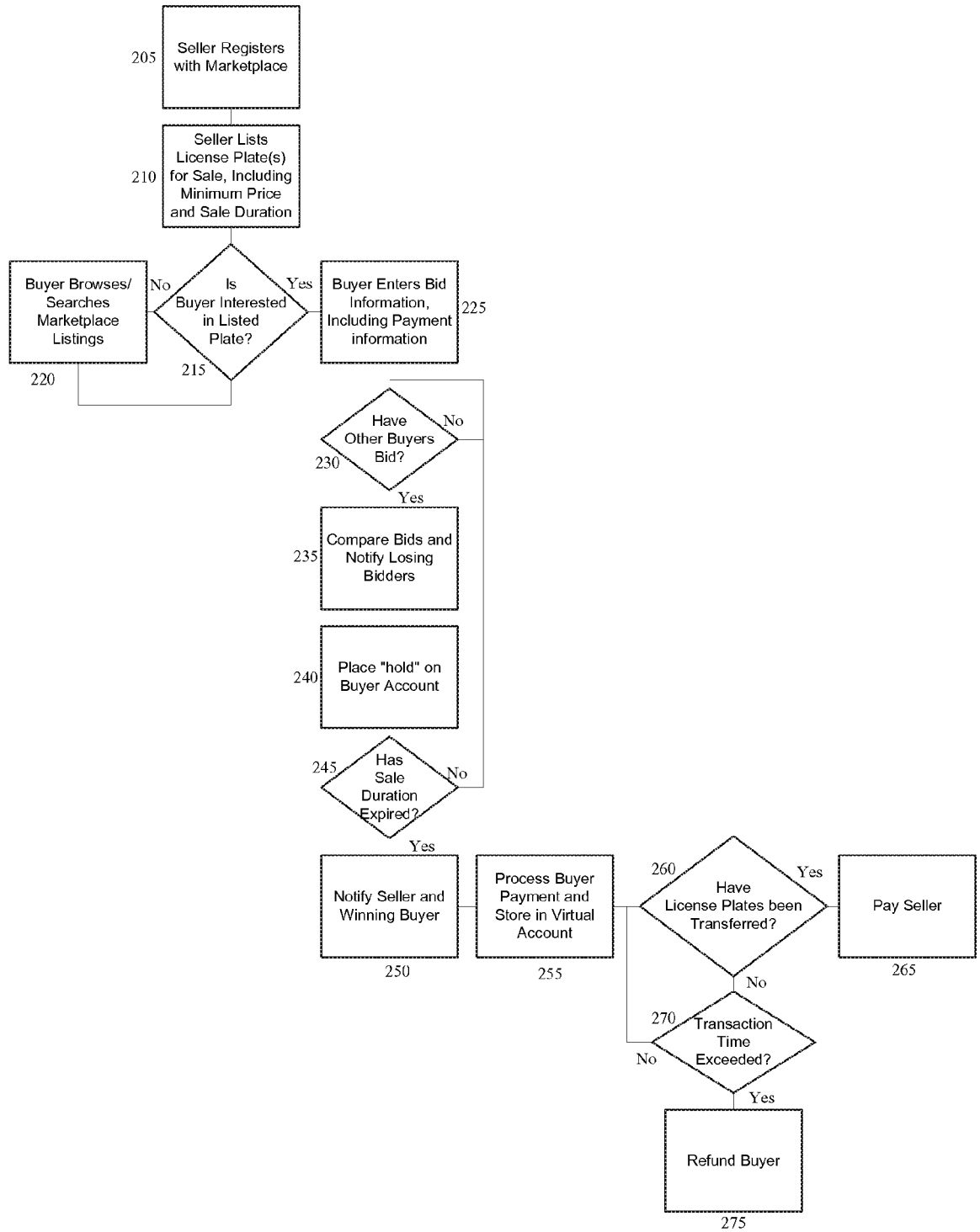
FIG. 2 is a flow chart illustrating a preferred transaction process.

FIG. 1 is a block diagram illustrating a preferred network architecture for supporting the present invention, and FIG. 2 is a flow chart illustrating a preferred transaction process. Although the network architecture and transaction process of FIGS. 1 and 2 are presently preferred, it should be apparent to one skilled in the art that alternative network architectures and transaction processes may be used without departing from the spirit or the scope of the invention.

As illustrated in FIG. 1, a preferred implementation of the present invention includes a redundant server architecture, represented as Internet Connections 135, Routers 140, Hub/Load Balancers 150, Servers 160, and Databases 170. Although FIG. 1 illustrates redundancy implemented as two hardware devices or internet connections, those skilled in the art should recognize that additional hardware devices and/or internet connections can be added without departing from the spirit or the scope of the present invention. Furthermore, it should be understood that although redundancy is preferred, redundancy is not necessary.

In the preferred embodiment of FIG. 1, the present invention is connected to Internet 130 through multi-homed Internet Connections 135. In a multi-homed connection, each of Internet Connections 135 is preferably provided via a different Internet Service Provider, and connectivity is preferably provided through separate transmission means, such as different physical cables, different satellite links, or other wired or wireless connectivity means.

Routers 140 connect Hub/Load Balancers 150 to the redundant Internet Connections 135. Hub/Load Balancers 150 allow Servers 160 to communicate with Internet 130. Hub/Load Balancers 150 also distribute incoming communications among Servers 160 so that each of Servers 160 can be utilized without overwhelming any of Servers 160.

Servers 160 are preferably Intel-based servers running the Windows 2000 Server operating system distributed by the Microsoft Corporation of Redmond, Wash.; one of the many LINUX operating system variants available; or another such operating system. Servers 160 preferably have World Wide Web server software installed thereon, such as Internet Information Server (IIS) distributed by the Microsoft Corporation of Redmond, Wash., or the Apache HTTP Server distributed by the Apache Software Foundation of Forest Hill, Md. Such World Wide Web server software can allow Servers 160 to provide external users with an interface to at least portions of Databases 170. Databases 170 preferably comprise both a software and a hardware element. The software element of Databases 170 is preferably implemented through software such as, but not limited to, SQL Server, distributed by Microsoft Corporation of Redmond, Wash.; MySQL, distributed by MySQL AB of Uppsala, Sweden; and Oracle 9i Database, distributed by Oracle Corporation of Redwood Shores, Calif. Although the hardware aspects of Databases 170 are illustrated as two separate database servers in FIG. 1, it should be appreciated by those skilled in the art that additional or alternative redundancy schemes may be used, such as, but not limited to, implementing Databases 170 as a Redundant Array of Inexpensive Disks (RAID) array with hot-swappable drives. Such techniques are well known in the art.

A license plate owner can use Seller Computer 110 to connect to Internet 130, and through that connection the license plate owner can communicate with the present invention. A license plate owner can utilize the World Wide Web server installed on Servers 160 to enter license plate information into Databases 170. Such information may include, but is not limited to, the state or federal agency issuing the license plate, the characters appearing on the license plate, the condition of the license plate, one or more renderings or photographs of the license plate, a minimum price at which the seller is willing to transfer his or her rights to the license plate, and comments from the seller.

A prospective buyer can utilize Buyer Computer 100, Buyer Personal Desktop Assistant (PDA) 105, or other such computer to connect to Internet 130, and through that connection the prospective buyer can communicate with the present invention. The prospective buyer can utilize the World Wide Web server installed on Servers 160 to browse the license plate information stored in Databases 170, search the license plate information stored in Databases 170, place a bid on or purchase a license plate, enter comments about a recently executed transaction, and other such functions.

Figure 3:
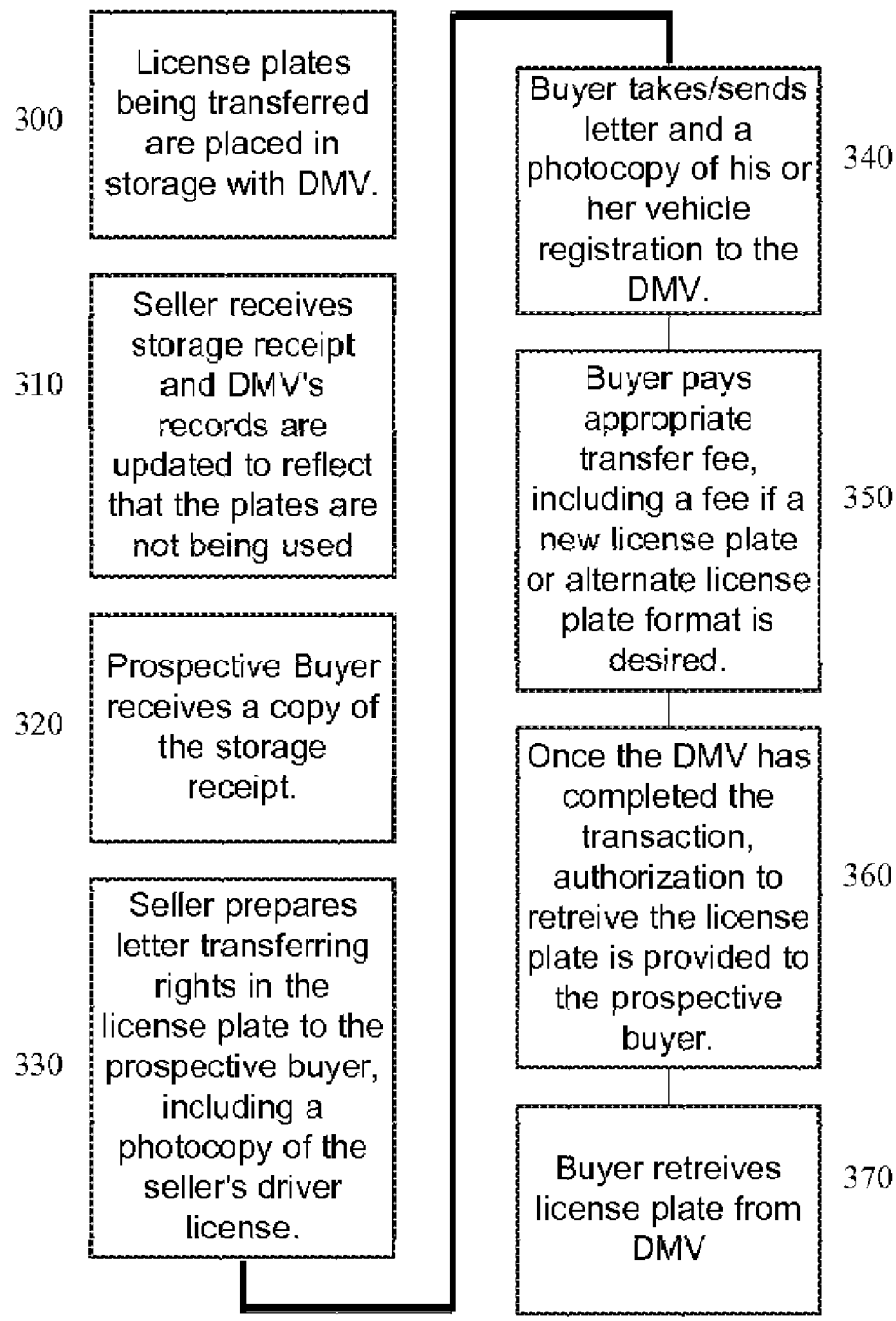
FIG. 3 is a flow chart illustrating a license plate transfer process.

Transfer of rights in a license plate can be accomplished in a variety of ways, as dictated by the state or federal agency issuing the license plate. By way of example, without intending to limit the present invention, FIG. 3 illustrates a process through which license plates can be transferred in New York state. In New York state, license plate transfers begin with the license plate being placed in storage with the Department of Motor Vehicles (DMV) (Block 300). The DMV provides a storage receipt to the license plate owner and the DMV's records are updated to reflect the fact that the license plates are no longer being used (Block 310). The seller sends the buyer a copy of the storage receipt (Block 320), along with a letter transferring the seller's rights in the license plates to the buyer and a copy of the seller's driver license (Block 330). The buyer provides the seller's documentation to the DMV, along with a copy of the buyer's vehicle registration (Block 340). The DMV may assess a fee to the buyer, with the amount of such a fee based on whether the buyer wishes to have a new plate issued, the format of the new plate, and other such factors (Block 350). Once the DMV has completed the transaction, including, but not limited to, recording the transfer of rights in the license plate and issuing a new license plate if the buyer requested one, the buyer is provided with authorization to retrieve the license plate (Block 360). The buyer can then retrieve the license plate from the DMV (Block 370).

By way of further example, without intending to limit the present invention, in Washington State, West Virginia, Connecticut, Florida, and Massachusetts, transfer may occur by the seller signing and having notarized a release of interest in the license plate. The notarized release of interest can be brought to a County Auditor's office, a Department of Motor Vehicles, or other such county or state office along with the license plate and, for a minor state fee, the license plates can be transferred to the prospective buyer. In most cases, if the seller is keeping the vehicle to which the license plate was registered, the seller must also apply for a new license plate and pay the appropriate fee.

To effectuate license plate transfers, the present invention may generate the paperwork and/or instructions for the seller and the prospective buyer to follow. The paperwork and/or instructions may also include a computer readable identification code, such as, but not limited to, a bar code, or similar human readable identification code. In a preferred embodiment, an operator at the state or federal agency receiving the license plate from the license plate owner will enter the license plate owner's identification code into Computer System 120. Computer System 120 will then preferably transmit information via Internet 130 to Server 160 confirming that the license plate has been received. When the prospective buyer picks up the license plate, an operator at the state or federal agency can enter the prospective buyer's identification code into Computer System 120. Computer System 120 will preferably transmit information via Internet 130 to Server 160 confirming that the license plate has been properly transferred to the prospective buyer.

FIG. 2 is a flow chart illustrating a preferred transaction process. Although the process of FIG. 2 is presently preferred, those skilled in the art should appreciate that alternative processes may be substituted therefor without departing from the spirit or the scope of the present invention.

The process of FIG. 2 preferably begins with a license plate owner, or seller, registering with the present invention (Block 205). Registration can include, but is not limited to, selecting a user name and password, entering the seller's mailing address and/or physical address, and entering the bank account or credit card account to which payment should be made in the event of any license plate sales.

Once registered, a seller can list one or more license plates for sale with the present invention (Block 210). Such listing may include, but is not limited to, selecting the type of sales transaction to be used (i.e. auction, standard sale, etc.), entering a minimum price at which the seller is willing to transfer his or her rights to the license plate, the length of time the license plate is to be listed, the state or federal agency issuing the license plate, the characters appearing on the license plate, one or more renderings or photographs of the license plate, and comments from the seller.

Prospective buyers can browse and/or search the database of license plates available through the present invention (Block 220). If a prospective buyer is interested in a license plate (Block 215), the prospective buyer can enter a bid or purchase the license plate (Block 225), as appropriate given the seller's chosen transaction type. In the embodiment illustrated in FIG. 2, prospective buyers can enter payment information at the time the bid is entered or the license plate is purchased. In an alternative embodiment, prospective buyers can register with the present invention in advance, wherein such registration can include storing payment information with the present invention.

If the seller has elected an auction-based transaction, and another bid has been entered for the license plate (Block 230), the prospective buyer's bid is compared against the current high bidder (Block 235). If the prospective buyer's bid is higher than the current high bidder, or if no other bids have been received, the prospective buyer becomes the current high bidder.

Where the prospective buyer has provided credit card or similar payment information to the present invention, a hold may be placed on the credit card for an amount proportionate to the prospective buyer's maximum bid (Block 240). Where the prospective buyer has provided a checking account number or similar information as a means of payment, the present invention may verify that sufficient funds are available to meet the maximum bid, including any fees. With accounts that do not support placing holds on the funds, such as traditional checking accounts, the present invention may periodically verify fund availability until the auction is complete or until the prospective buyer is no longer the high bidder. If the prospective buyer's payment means cannot support the amount bid, the prospective buyer's bid may be cancelled and the buyer with the previous high bid is preferably reinstated as the high bidder at his or her highest bid.

The seller and high bidder are notified, preferably via E-mail, when the transaction time specified by the seller has elapsed (Block 250) assuming the transaction was an auction. Alternatively, where the seller has chosen a traditional sale transaction, the seller and buyer may be notified when the buyer elects to purchase the license plate. As described above, the notification preferably includes instructions and documentation necessary to legally transfer the seller's rights in the license plate to the high bidder. If no high bidder exists, the present invention notifies the seller of the end of the transaction and gives the seller the option to list the license plate again.

Payment for the transaction is then processed against the buyer, whether the buyer is the high bidder in an auction or the buyer in a sales transaction (Block 255). The buyer's payment is preferably processed and held in escrow until confirmation is received that the license plates have been properly transferred to the buyer.

The present invention then waits for confirmation that the license plates have been properly transferred to the buyer (Block 260). In a preferred embodiment, the seller is given a fixed period of time, such as ten business days, within which to surrender the license plates to the issuing state or federal agency or otherwise legally transfer the plates to the buyer. Effective license plate transfer is preferably confirmed by the state or federal agency issuing the license plates. Where a state or federal agency provides license plate transfer confirmation, the present invention may refund at least a portion of the buyer's payment (Block 275) if confirmation is not received within a given period of time, such as ten business days (Block 270).

In an alternative embodiment, confirmation may be provided by the prospective buyer. Where prospective buyer confirmation is used, the present invention may provide payment to the seller if the prospective buyer has not confirmed transfer within a given period of time after the license plates were to have been transferred, such as twenty business days after transaction completion. Such time should be long enough to allow the prospective buyer to lodge a complaint in the event the license plates are not transferred in a timely manner so that the prospective buyer can be refunded or other actions taken as appropriate.

Through the system and methods described above, the present invention allows license plate owners to legally transfer their rights in the license plates to others. While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method of trading a license plate, comprising:
   receiving information about a license plate from a seller;
   storing the license plate information in a database;
   presenting license plate information to at least one prospective buyer;
   recording at least one prospective buyer's desire to purchase the license plate;
   notifying the seller and the prospective buyer;
   receiving payment from the prospective buyer; and
   receiving confirmation that the license plate has been transferred to the buyers, said confirmation comprising information originating from a state or federal agency.

2. The license plate trading method of claim 1, wherein the database contains information on a plurality of license plates.

3. The license plate trading method of claim 2, further comprising allowing a prospective buyer to input criteria regarding a desired license plate to facilitate searching the database.

4. The license plate trading method of claim 3, wherein the presenting step further comprises presenting license plate information which matches or is similar to the criteria input by the prospective buyer.

5. The license plate trading method of claim 1, wherein the license plate information includes a minimum price at which the seller will sell the license plate.

6. The license plate trading method of claim 5, wherein the license plate information presented to the at least one prospective buyer includes the seller minimum price.

7. The license plate trading method of claim 1, wherein the recording step includes receiving a price which the buyer is willing to pay for the license plate.

8. The license plate trading method of claim 5, wherein the recording of at least one prospective buyer's desire to purchase the license plate is handled in an auction format.

9. The license plate trading method of claim 8, wherein the seller and the prospective buyer are notified at the end of the auction.

10. The license plate trading method of claim 1, wherein the confirmation is provided by an authorized state or federal agency.

11. The license plate trading method of claim 1, wherein the confirmation is provided by the buyer.

12. The license plate trading method of claim 11, wherein, if confirmation is not provided by the buyer within a fixed time period, the transaction is assumed to have been confirmed and the seller is paid at least a portion of the buyer payment.

13. The license plate trading method of claim 1, wherein, if confirmation is not provided within a fixed time period, the transaction is assumed to not have occurred, and at least a portion of the buyer payment is refunded.

14. A license plate trading system, comprising:
   a database;
   a license plate information collection device communicatively coupled to the database;
   a license plate information display device communicatively coupled to the database;
   a buyer payment processing device communicatively coupled to the database;
   a license plate transfer confirmation device communicatively coupled to the database and configured to receive license plate transfer confirmation information originating from a state or federal agency; and, a seller payment processing device communicatively coupled to at least the buyer payment processing device, and configured to send payment after said receipt of said transfer confirmation information.

15. The license plate trading system of claim 14, further comprising a license plate information searching device.

16. The license plate trading system of claim 14, wherein the database stores the collected license plate information.

17. The license plate trading system of claim 14, wherein the license plate information collection device is one or more forms on a World Wide Web site.

18. The license plate trading system of claim 14, wherein the license plate information display device is one or more pages on a World Wide Web site.

19. The license plate trading system of claim 15, wherein the information searching device searches for exact matches of requirements entered by a prospective buyer.

20. The license plate trading system of claim 15, wherein the information searching device searches for exact matches and permutations of requirements entered by a prospective buyer.

* * * * *